United States Patent [19]

Cseh et al.

[11] Patent Number: 4,473,500

[45] Date of Patent: Sep. 25, 1984

[54] MONOAZO PIGMENTS DERIVED FROM AMINOPHTHALIMIDES AND SUBSTITUTED ACETOACETARYLIDES OR 2-HYDROXY-3-NAPHTHOYLARYLIDES

[75] Inventors: Georg Cseh, Arlesheim; Stefan Hari, Allschwil, both of Switzerland

[73] Assignee: Ciba-Geigy Corporation, Ardsley, N.Y.

[21] Appl. No.: 374,120

[22] Filed: May 3, 1982

[30] Foreign Application Priority Data

May 12, 1981 [CH] Switzerland .................... 3065/81

[51] Int. Cl.³ .............. C09B 29/036; C09B 29/32; C09B 29/33; D06P 1/44
[52] U.S. Cl. ...................... 260/157; 260/152; 260/155; 260/158; 106/288 Q; 106/308 Q; 106/308 F; 106/308 M; 106/308 N
[58] Field of Search ............... 260/152, 157, 158, 155

[56] References Cited

U.S. PATENT DOCUMENTS

| | | | |
|---|---|---|---|
| 3,551,407 | 12/1970 | Dehnert et al. | 260/152 |
| 3,644,405 | 2/1972 | Horstmann et al. | 260/156 |
| 3,825,527 | 7/1974 | Ruider et al. | 260/152 |
| 4,277,397 | 7/1981 | Fuchs | 260/157 |
| 4,312,807 | 1/1982 | Fuchs | 260/154 |

*Primary Examiner*—Floyd D. Higel
*Attorney, Agent, or Firm*—Luther A. R. Hall

[57] ABSTRACT

Monoazo pigment compounds of the formula

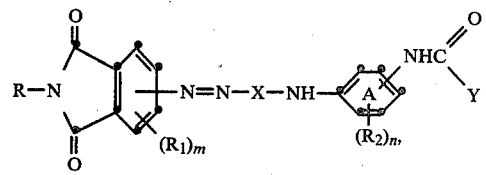

wherein X is a group of the formula

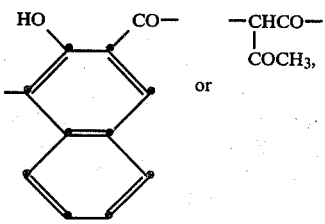

R is hydrogen or methyl, $R_1$ and $R_2$ are hydrogen, chlorine, methyl or methoxy, Y is methyl or phenyl, or Y is —O—, —S—, —N($R_3$)— or —C($R_4$)=CH—, each of which is bound on the ring A in the ortho-position with respect to the —NHCO— group to form a benzoxazolone, benzothiazolone, benzimidazolone or quinolone-2, with $R_3$ and $R_4$ being hydrogen or methyl, and m and n independently of one another are each 1 or 2, are useful as high-grade pigments, for pigmenting high-molecular weight organic material. The pigments are distinguished in particular by good fastness to light, migration and weather.

8 Claims, No Drawings

MONOAZO PIGMENTS DERIVED FROM AMINOPHTHALIMIDES AND SUBSTITUTED ACETOACETARYLIDES OR 2-HYDROXY-3-NAPHTHOYLARYLIDES

The present invention relates to novel phthalimidazo pigments, to their production, to the use thereof for dyeing organic materials, and to the dyed material.

In the Japanese Published Specifications Nos. 2191/66 and 18717/66 are described azo pigments obtained by the coupling of diazotised aminophthalimides with acetoacetylanilides or 2-hydroxy-3-naphthoic acid anilides; and from the Swiss Patent Specification No. 611 642 are known azo pigments obtained by the coupling of diazotised aminobenzimidazolones with acetoacetylaminoacetanilides. It has now been found that pigments with improved properties are obtained when diazotised aminophthalimides are coupled with suitably substituted acetoacetylanilides or 2-hydroxy-3-naphthoic acid anilides.

The invention thus relates to novel monoazo pigments of the formula I

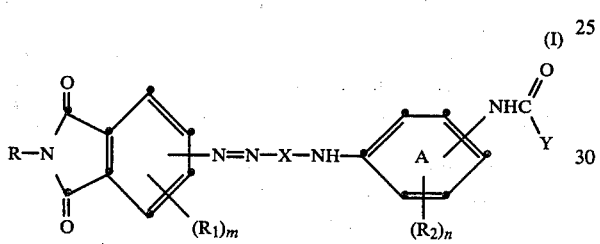

wherein X is a group of the formula II or III

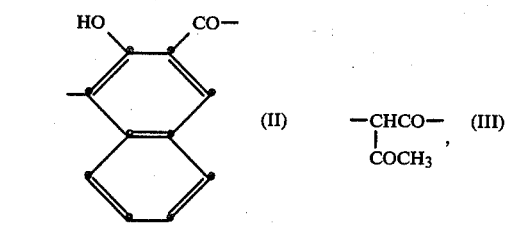

R is hydrogen or methyl, $R_1$ and $R_2$ are hydrogen, chlorine, methyl or methoxy, Y is methyl or phenyl, or —O—, —S—, —N($R_3$)— or —C($R_4$)=CH—, each of which is bound on the ring A in the ortho-position with respect to the —NHCO— group to form a heterocycle, with $R_3$ and $R_4$ being hydrogen or methyl, and m and n independently of one another are each 1 or 2.

The preferred meaning of n and m is 1.

Of particular interest are compounds of the formula I wherein X has the meaning defined above, R and $R_1$ are hydrogen, $R_2$ is hydrogen, chlorine, methyl or methoxy, and Y is methyl or phenyl, or —O—, —S—, —C(CH$_3$)=CH— or —NH—, each of which is bound on the ring A in the ortho-position with respect to the —NHCO— group to form a heterocycle.

Particularly preferred compounds correspond to the formula I wherein X has the meaning defined above, R and $R_1$ are hydrogen, $R_2$ is hydrogen, chlorine or methyl, and Y is methyl or phenyl, or —S— or —NH—, each of which is bound on the ring A in the ortho-position with respect to the —NHCO— group to form a heterocycle.

In especially preferred compounds of the formula I, Y is —S— or —NH—, each of which is bound on the ring A in the ortho-position with respect to the —NHCO— group to form a heterocycle.

Of special interest is the compound of the formula

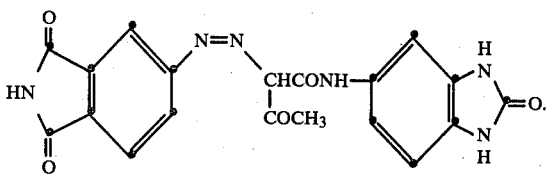

The compounds of the formula I are produced by known methods, for example by coupling a diazonium salt of an amine of the formula IV

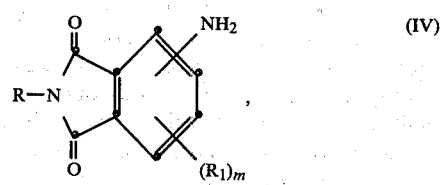

wherein R, $R_1$ and m have the meanings defined above, with a compound of the formula V

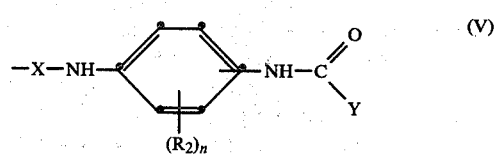

in which X is a group of the formula VI or VII

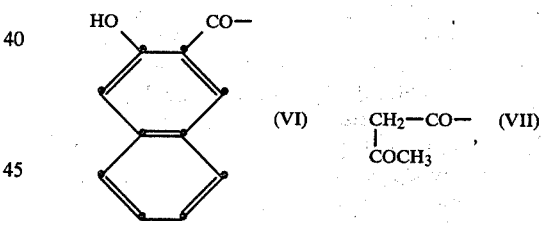

and $R_2$, n and Y have the meanings defined above.

The compounds of the formulae IV and V are known, and can be produced by known methods.

Examples of compounds of the formula IV are: 3-aminophthalimide,
4-aminophthalimide,
4-amino-5-methyl-phthalimide,
4-amino-5-chlorophthalimide, and
4-amino-5-methoxy-phthalimide.

Examples of coupling components according to formula V are:
4-acetylamino-(2'-hydroxy-3'-naphthoylamino)-benzene,
4-benzoylamino-(2'-hydroxy-3'-naphthoylamino)-benzene,
4-p-chlorobenzoylamino-(2'-hydroxy-3'-naphthoylamino)-benzene,
6-(2'-hydroxy-3'-naphthoylamino)-benzimidazolone,
5-chloro-6-(2'-hydroxy-3'-naphthoylamino)-benzimidazoline, 5-methyl-6-(2'-hydroxy-3'-naphthoylamino)-benzimidazolone,
4-acetoacetylamino-acetanilide,
4-acetoacetylamino-benzanilide,
4-acetoacetylamino-p-chlorobenzanilide,
6-acetoacetylamino-benzimidazolone,
6-acetoacetylamino-5-chlorobenzimidazolone,
6-acetoacetylamino-5-methyl-benzimidazolone, and
6-acetoacetylamino-4-methyl-7-chloroquinolone.

Diazotisation is performed by known methods.

Coupling is effected preferably in a slightly acid medium, advantageously in the presence of customary agents promoting coupling. Those which may be mentioned are in particular dispersing agents, for example aralkylsulfonates, such as dodecylbenzenesulfonate, or 1,1'-dinaphthylmethane-2,2'-disulfonic acid or polycondensation products of ethylene or propylene oxides. The coupling component dispersion can advantageously contain also protective colloids, for example methyl cellulose, or smallish amounts of inert organic solvents difficultly soluble or insoluble in water, for example aromatic hydrocarbons which can be halogenated or nitrated, such as benzene, toluene, xylene, chlorobenzene, dichlorobenzene or nitrobenzene, as well as aliphatic halogenated hydrocarbons, for example carbon tetrachloride or trichloroethylene, also organic solvents miscible with water, such as acetone, methyl ethyl ketone, methanol, ethanol or isopropanol, or preferably dimethylformamide.

Coupling can also be advantageously performed by continuously combining, in a mixing nozzle, an acid solution of the diazonium salt with an alkaline solution of the coupling component, whereby an immediate coupling of the components occurs. It is to be ensured that the diazo component and coupling component are present in equimolar amounts in the mixing nozzle. It has proved in this respect advantageous however to use a slight excess of diazo component. This is effected most simply by regulating the pH-value of the liquid in the mixing nozzle. It is also necessary to create a strong turbulent motion of the two solutions in the mixing nozzle. The formed pigment dispersion is continuously drawn off from the mixing nozzle and the pigment is separated by filtration.

Finally, coupling can also be carried out by suspending the amine with the coupling component, in the molar ratio of 1:1, in an organic solvent, and treating the suspension with a diazotising agent, especially with an ester of nitrous acid, such as methyl, ethyl, butyl, amyl or octyl nitrite.

The pigments can be isolated from the reaction mixture by filtration. It has proved advantageous to subsequently treat the isolated pigments in water or in an organic solvent preferably boiling above 80° C., optionally under pressure. Particularly suitable organic solvents are benzenes substituted by halogen atoms or by alkyl or nitro groups, for example toluene, xylene, chlorobenzene, o-dichlorobenzene or nitrobenzene, as well as pyridine bases, such as pyridine, picoline or quinoline, also ketones, such as cyclohexanone, ethers, such as ethylene glycol monomethyl or -monoethyl ether, amides, such as dimethylformamide or N-methyl-pyrrolidone, sulfolane or dimethyl sulfoxide. The aftertreatment can also be performed in water in the presence of organic solvents, and/or with the addition of surface-active substances. The aftertreatment is carried out preferably by heating the pigment in water or in an organic solvent at 100° to 160° C. under pressure. There occurs in many cases a coarsening of the particles, which has a favourable effect on the hinding power and fastness to light and to migration of the pigments obtained.

The novel pigments are suitable for pigmenting high-molecular organic materials, for example cellulose ethers and esters, linear polyamides or linear polyurethanes or polyesters, acetyl cellulose, nitrocellulose, natural resins or synthetic resins, such as polymerisation resins or condensation resins, for example aminoplasts, especially urea-formaldehyde resins and melamine-formaldehyde resins, alkyd resins, phenoplasts, polycarbonates, polyolefins, such as polyethylene, polypropylene, polystyrene, polyvinyl chloride, polyacrylonitrile, polyacrylates, rubber, casein, silicones and silicone resins. It is possible to pigment not only the homogeneous compounds but also mixtures thereof.

It is in this respect not important whether the said high-molecular compounds are in the form of plastics or in the form of melts; or in the form of spinning solutions, lacquers, paints or printing pastes. Depending on the purpose of application, it is advantageous to use the novel pigments as toners, or in the form of preparations.

The preparations can contain, besides the pure pigment, for example natural resins, such as abietic acid or esters thereof, ethyl cellulose, cellulose acetobutyrate, alkaline-earth salts of higher fatty acids, fatty amines, for example stearylamine or rosinamine, vinyl chloride/vinyl acetate copolymers, polyacrylonitrile or polyterpene resins, or water-soluble dyes, for example dye sulfonic acids or alkaline-earth metal salts thereof.

The pigments according to the invention are distinguished by high colour strength, by good fastness to light, migration, weather and heat, and by good flow properties.

The following Examples illustrate the invention.

EXAMPLE 1

1.62 g of 4-aminophthalimide are heated in 60 ml of glacial acetic acid to 100° C., and subsequently stirred up with 5 ml of 37% (by weight) aqueous hydrochloric acid. The suspension is cooled to 5° C., and within 8 minutes are added dropwise 2.5 ml of aqueous 4N sodium nitrite solution. The diazo solution obtained is filtered until clear. 3.82 g of 4-benzoylamino-(2'-hydroxy-3'-naphthoylamino)-benzene are dissolved at 42° C. in 4 ml of 30% (by weight) aqueous sodium hydroxide solution, 50 ml of water and 100 ml of alcohol. The solution is filtered, cooled to 8° C., and at this temperature is added dropwise, within 10 minutes, the diazo solution produced as described above. The pH-value of the red suspension is adjusted to 5 with 30 ml of 30% (by weight) aqueous sodium hydroxide solution. The suspension is stirred firstly for 4 hours until the temperature has risen to 20° C. The suspension is then heated within 1 hour to 75° C., and is filtered at this temperature. The filter residue is washed free from salt with warm water, and afterwards dried at 60° C. in vacuo. The yield is 5.1 g (91% of theory, relative to the 4-aminophthalimide) of a red pigment of the formula

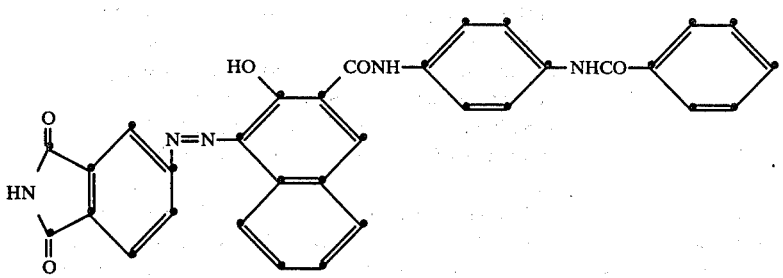

The pigment, aftertreated for 1 hour at 151° C. in dimethylformamide, produces in polyvinyl chloride fast carmine red dyeings of high colour strength.

Analysis: $C_{32}H_{21}N_5O_5$
calculated: C: 69.2%; H: 3.8%; N: 12.6%; O: 14.4%;
found: C: 69.4%; H: 3.6%; N: 12.8%; O: 14.3%.

EXAMPLE 2

1.62 g of 4-aminophthalimide are diazotised in a manner analogous to that described in Example 1, and the product obtained is coupled with 2.34 g of 4-acetoacetylaminoacetanilide. The yield after drying at 60° C. in vacuo is 3.8 g (94% of theory, relative to 4-aminophthalimide) of a yellow pigment of the formula

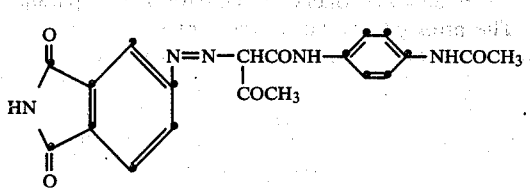

The pigment, aftertreated for 10 hours at 120° C. in ethylene glycol ethyl ether, produces in polyvinyl chloride fast brilliant greenish-yellow dyeings of high colour strength.

Analysis: $C_{20}H_{17}N_5O_5$
calculated: C: 59.0% H: 4.2%; N: 17.2%; O: 19.7%;
found: C: 58.9% H: 4.2%; N: 17.3%; O: 19.7%.

EXAMPLE 3

In a manner analogous to that of Example 1, 1.62 g of 4-aminophthalimide are diazotised, and the resulting product is coupled with 2.33 g of 5-acetoacetylaminobenzimidazolone. The yield after drying at 60° C. in vacuo is 3.9 g (96% of theory, relative to 4-aminophthalimide) of a yellow pigment of the formula

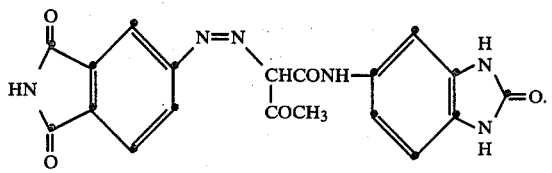

The pigment, aftertreated for 10 hours at 130° C. in dimethylformamide, produces in polyvinyl chloride fast brilliant yellow dyeings of high colour strength.

Analysis $C_{19}H_{14}N_6O_5$
calculated: C: 56.2%; H: 3.5%; N: 20.7%; O: 19.7%;
found: C: 56.1%; H: 3.4%; N: 20.6%; O: 20.1%.

EXAMPLE 4

There is obtained in a manner analogous to that of Example 1, by diazotisation and coupling of N-methyl-4-aminophthalimide with 5-methyl-6-(2'-hydroxy-3'-naphthoylamino)-benzimidazolone, a violet pigment of the summation formula $C_{26}H_{19}N_6O_5$.

Analysis:
calculated: C: 63.03%; H: 3.84%; N: 16.97%; O: 16.16%; found: C: 62.90%; H: 3.78%; N: 17.01%; O: 16.05%.

EXAMPLES 5-12

In a manner analogous to that of Example 1, there are obtained, by diazotisation and coupling of the amines listed in the following Table in column I with the coupling components shown in column II, pigments having the shades given in column III (0.2% (by weight) of pigment in polyvinyl chloride).

| | I Amine | II Coupling Component | III Shade |
|---|---|---|---|
| 5 | 3-amino phthalimide | 2-hydroxy-3-naphthoyl-amino-(4'-acetamino)-aniline | red |
| 6 | 4-amino-phthalimide | 5-chloro-6-(2'-hydroxy-3'-naphthoylamino)-benzimidazolone | carmine red |
| 7 | 4-amino-phthalimide | 2-hydroxy-3-naphthoyl-amino-(2',5'-diethoxy-4'-benzoylamino)-benzene | red |
| 8 | 4-amino-5-chloro-phthalimide | 5-acetoacetylamino-benzimidazolone | yellow |
| 9 | N—methyl-4-amino-phthalimide | 5-chloro-6-(2'-hydroxy-3'-naphthoylamino)-benzimidazolone | brown |
| 10 | 4-amino-phthalimide | 5-methyl-6-(2'-hydroxy-3'-naphthoylamino)-benzimidazolone | claret shade |
| 11 | 4-amino-phthalimide | 6-acetoacetylamino-benzothiazolone | greenish-yellow |
| 12 | N—methyl-4-amino phthalimide | 4-methyl-7-(2'-hydroxy-3'-naphthoylamino)-quinolone-2 | red |

What is claimed is:
1. A monoazo pigments compound of the formula

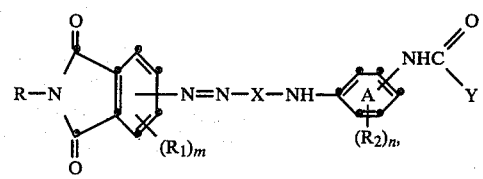

wherein X is a group of the formula

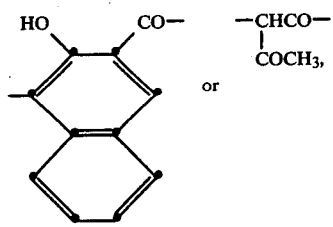

R is hydrogen or methyl, $R_1$ and $R_2$ are hydrogen, chlorine, methyl or methoxy, Y is methyl or phenyl, or Y is —O—, —S—, —N($R_3$)— or —C($R_4$)=CH—, each of which is bound on the ring A in the ortho-position with respect to the —NHCO— group to form a benzoxazolone, benzothiazolone, benzimidazolone or quinolone-2, with $R_3$ and $R_4$ being hydrogen or methyl, and m and n independently of one another are each 1 or 2.

2. A compound according to claim 1, wherein R and $R_1$ are hydrogen, $R_2$ is hydrogen, chlorine, methyl or methoxy, and Y is methyl or phenyl, or Y is —O—, —S—, —NH— or —C(CH$_3$)=CH—, each of which is bound on the ring A in the ortho-position with respect to the —NHCO— group to form a benzoxazolone, benzothiazolone, benzimidazolone or quinolone-2.

3. A compound according to claim 1, wherein R and $R_1$ are hydrogen, $R_2$ is hydrogen, chlorine or methyl, and Y is methyl or phenyl, or Y is —S— or —NH—, each of which is bound on the ring A in the ortho-position with respect to the —NHCO— group to form a benzothiazolone or benzimidazolone.

4. A compound according to claim 1 of the formula I, wherein Y is —S— or —NH—, each of which is bound on the ring A in the ortho-position with respect to the —NHCO— group to form a benzothiazolone or benzimidazolone.

5. A compound according to claim 1 of the formula I, wherein m and n are each 1.

6. A compound according to claim 1 of the formula I, wherein X is a group of the formula

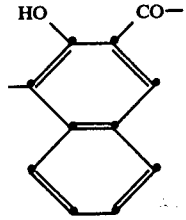

7. A compound according to claim 1 of the formula I, wherein X is a group of the formula

8. A compound of the formula

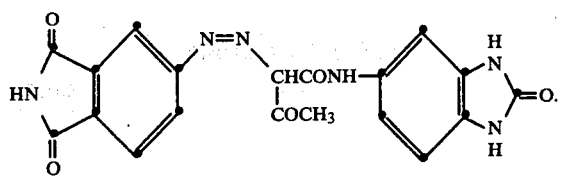

* * * * *